Oct. 15, 1929.  G. H. TERRELL  1,731,732
UNDERREAMER
Filed Dec. 10, 1928  2 Sheets-Sheet 1
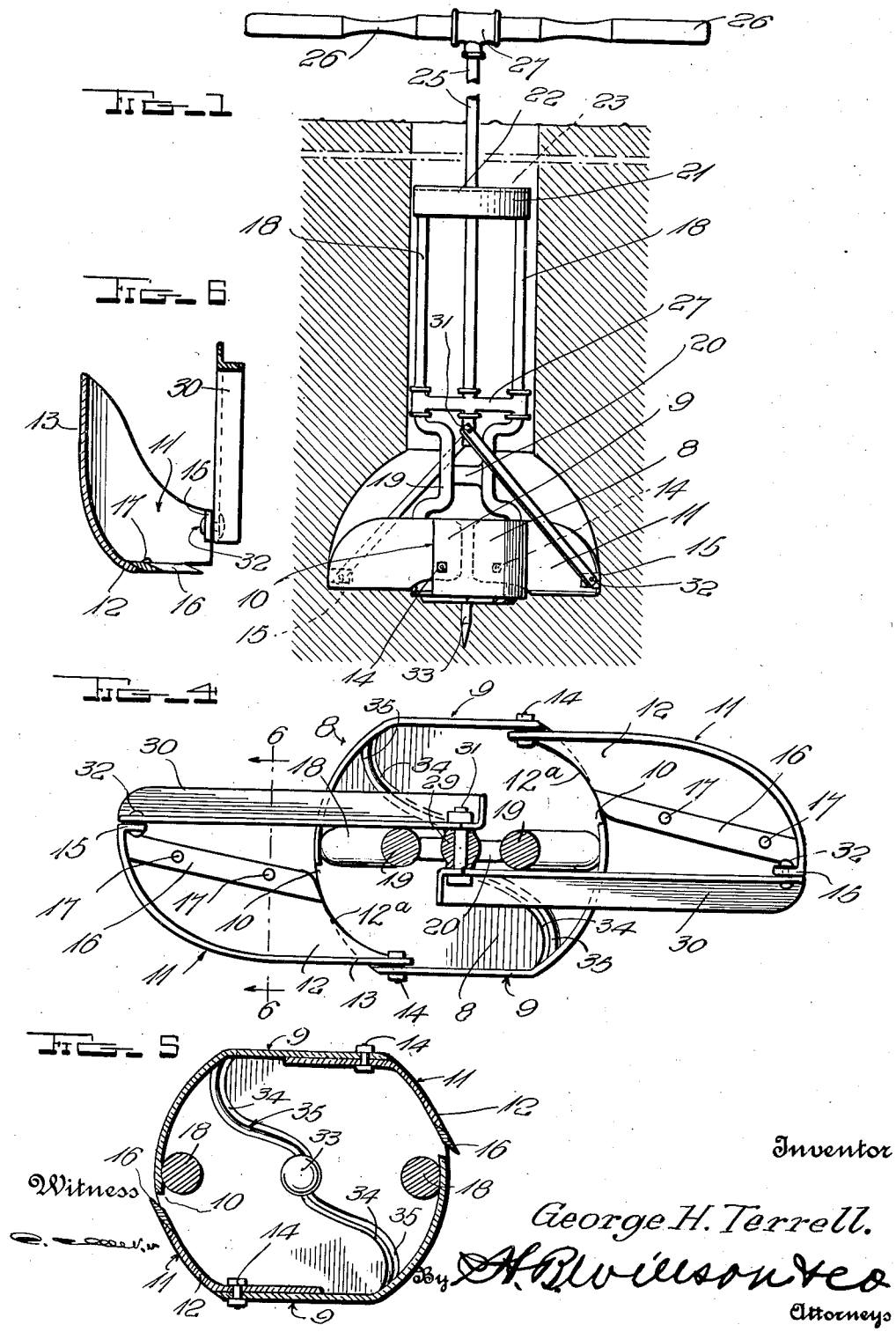
Inventor
George H. Terrell.
By H. B. Willson & Co
Attorneys

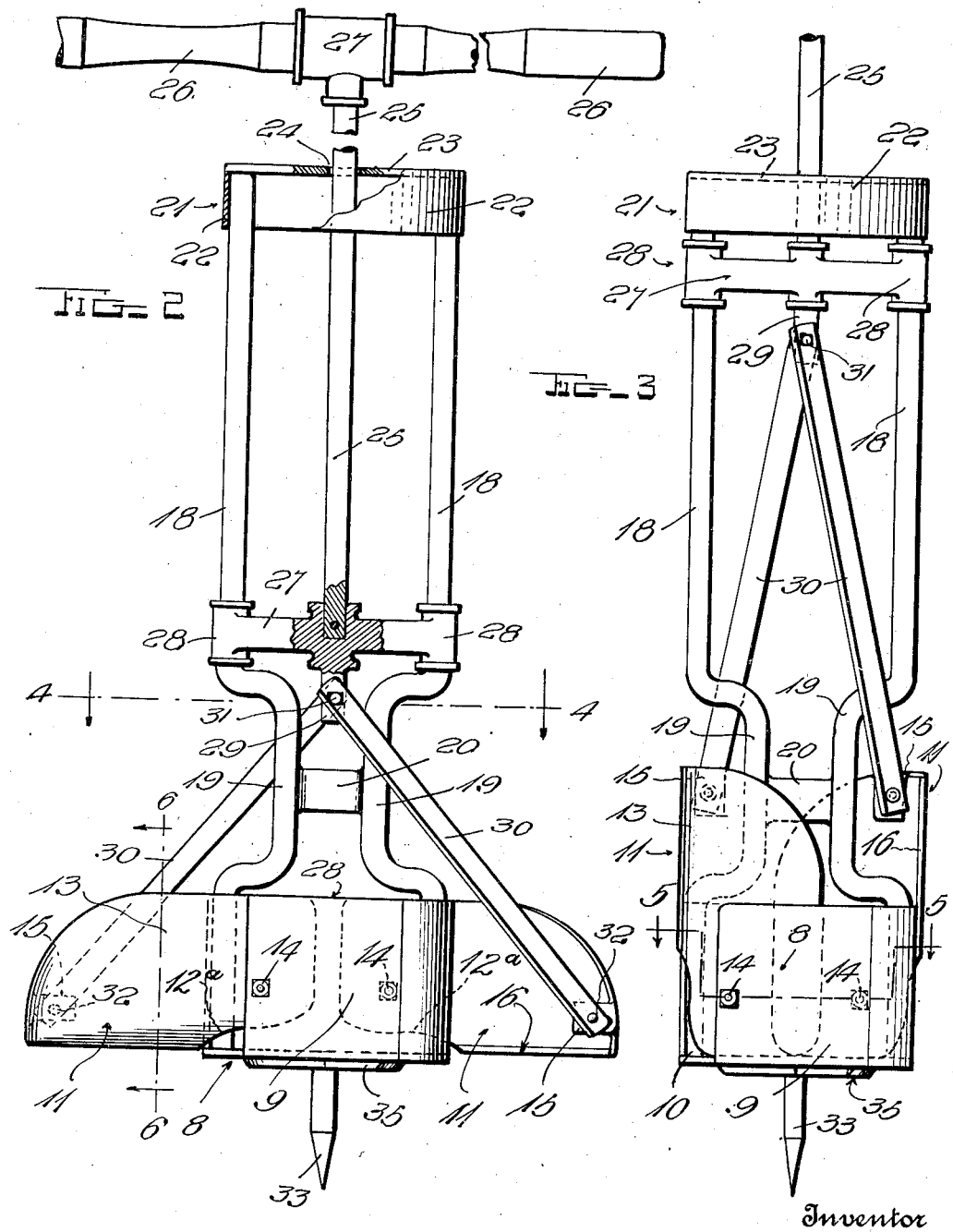

Patented Oct. 15, 1929

1,731,732

UNITED STATES PATENT OFFICE

GEORGE H. TERRELL, OF SAN ANTONIO, TEXAS

UNDERREAMER

Application filed December 10, 1928. Serial No. 324,924.

The invention relates to improvements in underreamers for enlarging the lower ends of holds formed with post-hole augers or the like, permitting cement when poured into the holes to have an enlarged footing.

The device is of the general type embodying a rotatable earth-receiving pan and an outwardly and downwardly swingable cutter for enlarging the lower end of the hole and directing the loosened dirt into the pan to be removed by the latter upon removal of the tool, and it is the principal object of the invention to provide a new and improved construction which is exceptionally simple and inexpensive, yet is efficient, reliable, long-lived and generally desirable.

To upwardly and downwardly swing the cutter, means are provided embodying a link pivoted to the outer end of the cutter, and it is another object of the invention to so relate this link with other parts as to cause it to effectively brace the cutter, holding the latter against any tendency to lag and unduly strain its pivot.

With the foregoing in view, the invention resides in the novel subject matter hereinafter described and claimed, description being accomplished by reference to the accompanying drawings.

Fig. 1 is a side elevation showing the device in use.

Fig. 2 is an enlarged side elevation partly broken away and in section, the parts being in the same positions as in Fig. 1.

Fig. 3 is a fragmentary side elevation showing the tool in condition for insertion into or withdrawal from the hole.

Fig. 4 is a horizontal sectional view on line 4—4 of Fig. 2.

Fig. 5 is a similar view on line 5—5 of Fig. 3.

Fig. 6 is a detail transverse sectional view on line 6—6 of Figs. 2 and 4.

The form of construction herein illustrated has proven to meet all requirements in an effective manner and this construction will be specifically explained, with the understanding that within the scope of the invention as claimed, variations may be made.

The numeral 8 denotes an earth-receiving pan of substantially circular outline although its side wall is preferably provided with two parallel flattened portions 9, said wall being formed with notches 10, one of which is adjacent one of the flat portions 9 while the other is adjacent the other of these portions. Two cutters 11 extend through the notches 10 respectively when in operative position and each cutter embodies a substantially horizontal bottom portion 12 and a vertical wall 13 rising therefrom, the cutters being transversely curved so that the two portions 12—13 merge gradually into each other as shown. The wall portions 13 are pivoted at 14 to the wall portions 9 of the pan 8, so that the two cutters may swing to and from vertical and horizontal positions. The bottom portion 12 of each cutter has its inner 12$^a$ disposed at an acute angle to the wall portion 13 so that the free longitudinal edge of said bottom portion 12 is relatively short and does not lie upon the bottom of the pan 8 when the cutters are extended. Thus, there is no danger of earth being jammed between the cutter bottoms 12 and the pan bottom and interfering with maximum downward swinging of the cutters. The walls 13 are longitudinally curved as shown most clearly in Fig. 4, their free ends are provided with inwardly projecting lugs 15 spaced above the bottom portions 12, and said walls decrease in height toward said lugs. The free edges of the bottom portions 12 are provided with cutting blades 16 detachably secured thereto by any desired means 17 so that a type of blade suitable to the earth in which the tool must be operated, may be applied. As the tool is rotated, the cutters 11 cut the earth and direct it into the pan 8 and when this pan is about full and the tool must be removed to dump its contents, the cutters 11 are swung upwardly as shown in Fig 3, at which time said cutters substantially close the notches 10 to prevent discharge of earth therethrough.

A rigid frame structure is secured to and rises from the pan 8. In the present showing, the lower ends of two vertical bars 18 are welded or otherwise secured to the side walls of the pan 8 at the edges of the notches 10 remote from the pivots 14. Near their lower ends, these bars 18 are provided with inwardly offset portions 19 which receive the outer ends of the cutter walls 13 when the cutters 11 are upwardly swung as in Fig. 3, said portions 19 being rigidly connected with each other by a lug or block 20 to which they are preferably welded. Above the portions 19, the bars 18 are parallel and their upper ends are welded or otherwise secured to a head 21 of circular form. This head preferably comprises a metal ring 22 welded to the upper ends of the bars 18, and a metal plate 23 spanning said ring and welded both to the latter and to the upper extremities of said bars. This plate 23 is formed with a central opening 24 through which a vertical drive rod 25 passes slidably, the upper end of said drive rod having an appropriate handle 26 while its lower end is rigidly secured in any desired manner to a cross-head 27. This cross-head is provided with guide sleeves 28 which are slidable upon the parallel upper portions of the bars 18, and in the present showing, said cross head is equipped with a downwardly projecting, flat-sided lug 29. Two links 30 preferably of angle metal, have their upper ends pivoted at 31 to the lug 29 while their lower ends are pivoted at 32 to the lugs 15 of the cutters 11. These links co-operate with the cross-head 27 and the drive rod 25 in upwardly swinging the cutters 11 when the handle 26 is raised, and in projecting said cutters when said handle is forced downwardly, and when the cutters are in operative position as seen in Figs. 1, 2 and 4, the links 30 bear solidly against the portions 19 of the bars 18. By so doing, they effectively brace the cutters 11 so that the outer ends of the latter can have no tendency to lag and pry rearwardly, with danger of loosening the pivots 14 or otherwise injuring the cutters or the pan 8.

The bottom of the pan 8 is provided with a spike 33 to enter the earth at the bottom of the hole being underreamed, thereby centering the lower portion of the reamer while the circular head 21 centers its upper end. By preference, the aforesaid pan bottom is formed with two slots 34 extending from its center to its periphery and is provided along the rear edges of these slots with cutters 35. These cutters serve to elevate loose dirt from the bottom of the hole and direct it into the pan 8.

In operating the invention, it is positioned as seen in Fig. 3 and is then lowered into the hole whose lower end is to be underreamed. Then, by forcing downwardly upon the handle 26 and rotating the entire tool by means of this handle, the cutters 11 operate upon the earth and direct the dirt which they cut into the pan 8. When this pan is about full, the handle 26 is pulled upwardly, thereby upwardly swinging the cutters 11 and causing them to substantially close the notches 10 so that the earth in the pan is confined and is readily removed by withdrawing the entire tool from the hole. After dumping of this earth, the tool is again inserted and the operation above described is repeated. When the pan is again substantially full, the cutters are again swung upwardly and the tool withdrawn from the hole to discharge the dirt, and these operations are repeated as many times as may be necessary until the lower portion of the hole is enlarged the required extent as seen in Fig. 1.

Not only is the construction of the device comparatively simple and inexpensive, but said construction is of such nature that the tool will be proof against warping or breakage even under severe strain, so that it will be long-lived and give practically no trouble with regard to repairs. The blades 16 may of course need sharpening or replacing from time to time but this may be readily accomplished due to the detachability of said blades. This detachable feature is also of importance as it permits blades of the proper type to be applied to the tool according to the character of the soil in which it must operate.

Attention is again invited to the fact that while the preferred construction has been shown and described, variations may be made within the scope of the invention as claimed.

I claim:—

1. An underreamer comprising a vertically elongated rigid frame having a rod guide at its upper end, an earth-receiving pan secured to the lower end of said frame, the side wall of said pan being formed with a notch, a cutter pivoted to said pan and extending through said notch, said cutter being shaped to direct the earth cut thereby into the pan, a cross-head slidably mounted on the frame for vertical movement, a driving rod passing slidably through the aforesaid rod guide and secured to said cross-head for rotating the entire tool and for raising and lowering said cross-head, and a link pivoted to said cross-head and said cutter for projecting the latter upon lowering of said cross-head and for upwardly swinging said cutter upon lifting of said cross-head.

2. An underreamer comprising an earth-receiving pan whose side wall is formed with a notch, a cutter pivoted to the pan and extending through said notch, said cutter being shaped to direct the earth cut thereby into the pan, two vertical bars secured to and rising from said pan, said bars having parallel portions, a circular head secured to the upper ends of said bars and having a rod guide disposed centrally between them, a cross-head having guide sleeves on its ends slidably surrounding said parallel portions of said bars, a drive rod passing slidably through the aforesaid guide and secured at its lower end to said cross-head, and a link pivoted to said cross-head and said cutter for projecting said cutter when the cross-head is lowered and for upwardly swinging said cutter upon raising of said cross-head.

3. A structure as specified in claim 2; said link extending across and contacting with one of said side bars when the cutter is in projected position, thereby preventing said cutter from having a tendency to lag and pry upon its pivot.

4. A structure as specified in claim 1; said cutter being so shaped and pivoted as to substantially close said notch when raised.

5. A structure as specified in claim 1; said cutter being pivoted to said pan at one side of said frame, said link being disposed at the other side of said frame, the cutter being provided with a side wall curved to the link, said frame having an inward offset which receives said curved cutter wall when the cutter is upwardly swung.

In testimony whereof I have hereunto affixed my signature.

GEORGE H. TERRELL.